Feb. 13, 1968  R. E. BREMER ETAL  3,368,640
SPEED CONTROL SYSTEM FOR AUTOMOTIVE VEHICLES
Filed Nov. 16, 1965  2 Sheets-Sheet 2
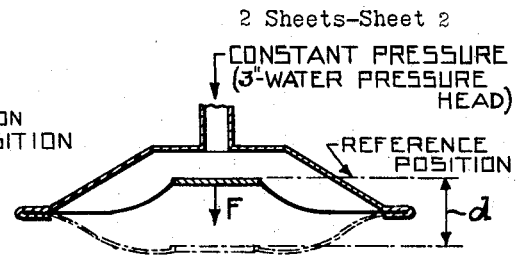
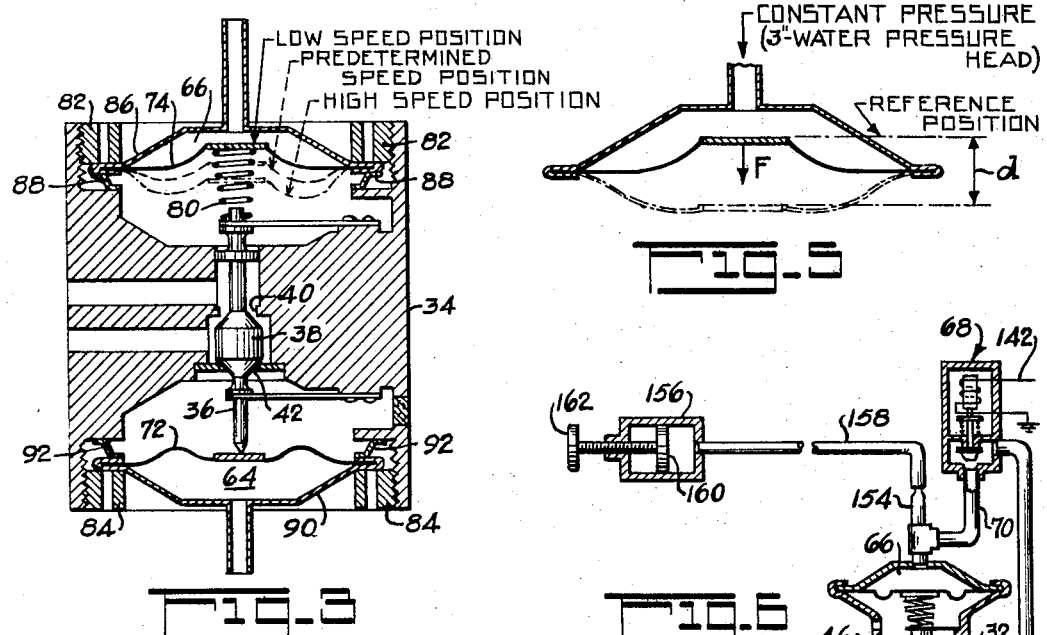
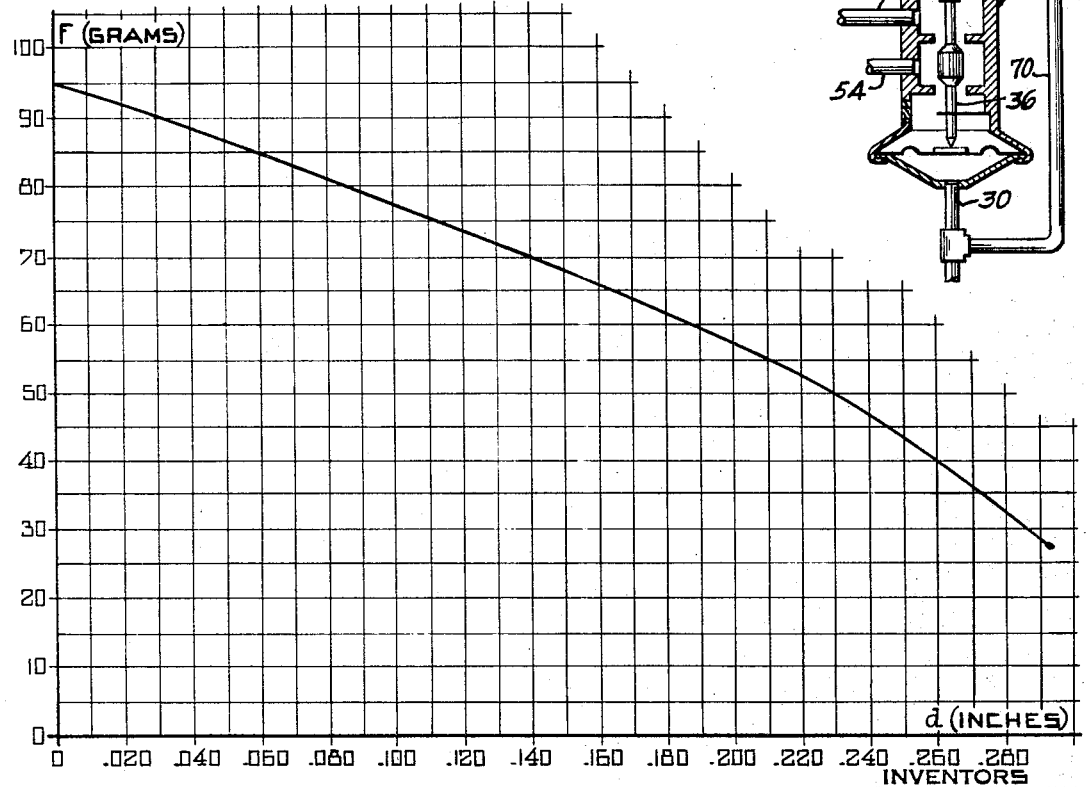
INVENTORS
ROGER E. BREMER
ROBERT L. DANGLER
BY
*William V. Ebs*
THEIR ATTORNEY

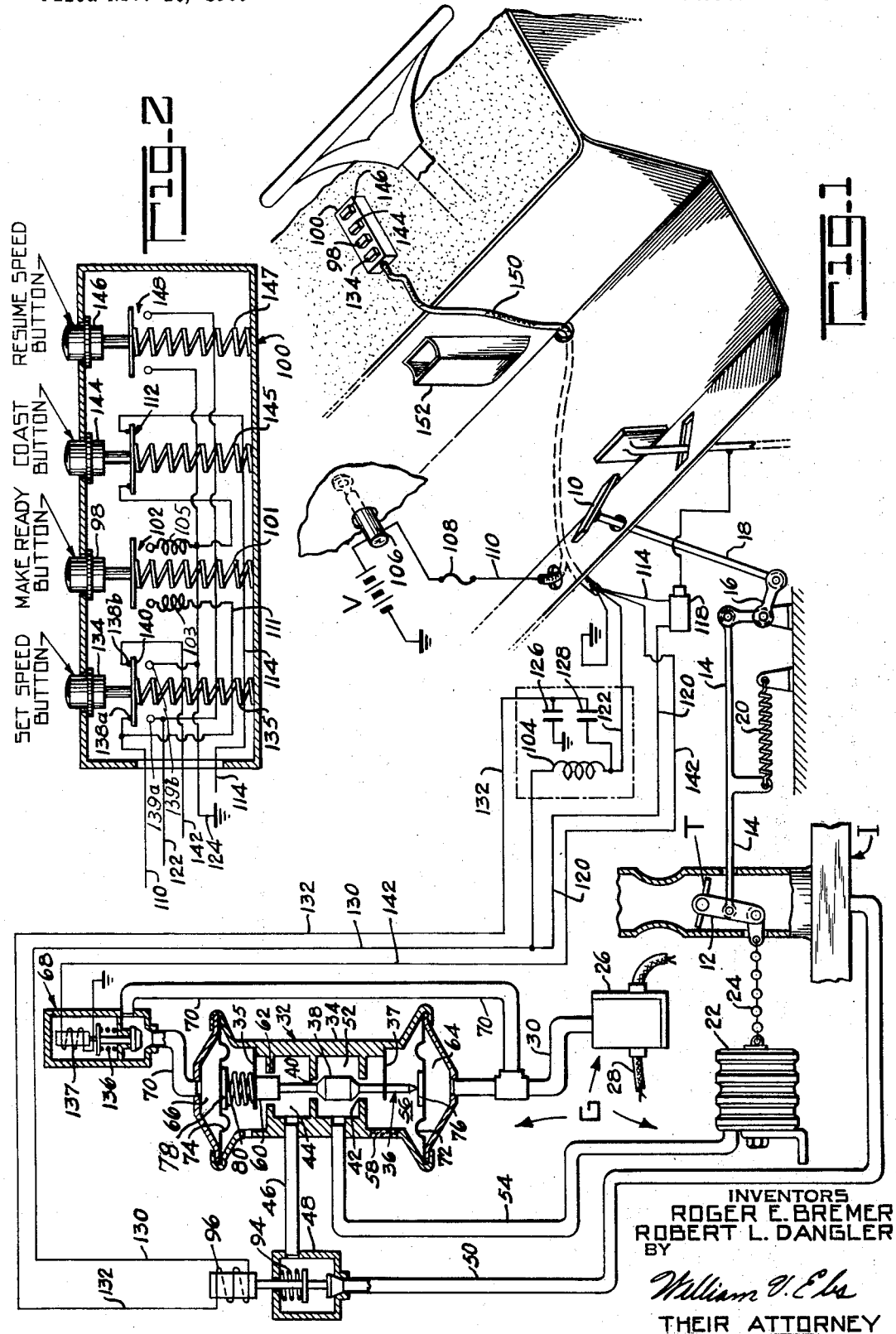

United States Patent Office 3,368,640
Patented Feb. 13, 1968

3,368,640
SPEED CONTROL SYSTEM FOR
AUTOMOTIVE VEHICLES
Roger E. Bremer and Robert L. Dangler, Shaker Heights,
Ohio, assignors to Curtiss-Wright Corporation, a corporation of Delaware
Filed Nov. 16, 1965, Ser. No. 508,050
13 Claims. (Cl. 180—108)

ABSTRACT OF THE DISCLOSURE

A movable, manually operable speed control unit which can be conveniently positioned by the driver of the vehicle or stored out of the way when not in use is provided in an automotive speed control system which includes a servo valve having pressure responsive diaphragms that can be relatively positioned to select a speed above which the valve may be controlled by said unit to decrease vehicle speed and below which the valve may be controlled by said unit to increase vehicle speed.

---

Our invention relates to speed control systems for automotive vehicles of the type disclosed, for example, in the pending patent application of Robert L. Dangler and Richard R. Maruca, Serial No. 366,519 filed May 11, 1964 (now Patent No. 3,249,176), and has as a prime object the provision of an improved control system which a driver can operate with a minimum of effort to exercise various modes of control over vehicle speed.

It is also an object of the invention to provide an improved speed control system for automotive vehicles enabling a driver to exercise a high degree of control over vehicle speed merely by the selective operation of a plurality of control buttons.

It is another object of the invention to provide an improved speed control system for automotive vehicles which can be operated from a movable control unit that can be conveniently positioned for use by a driver or stored out of the way.

It is still another object of the invention to provide a speed control system for automotive vehicles enabling a driver by the operation of manually controllable elements to increase speed, to initiate automatic speed control at a selected operating speed, to interrupt automatic speed control, or to initiate a resumption of automatic speed control after the vehicle speed has been reduced from a previously selected governing speed whereby the vehicle is caused to accelerate to the previously selected speed and to remain at such speed.

It is a further object of the invention to provide a speed control system for automotive vehicles having a servo valve which can be conditioned to automatically regulate speed to a selected operating speed and which can also be operated by the driver of the vehicle to change speed.

It is yet another object of the invention to provide a speed control system for automotive vehicles having a servo valve which can be operated by a driver of the vehicle to increase speed when vehicle speed is less than a predetermined speed and can be operated to decrease speed when vehicle speed is greater than such predetermined speed.

Other objects and advantages of the invention will become apparent from a reading of the specification taken in connection with the accompanying drawings in which:

FIG. 1 is a schematic view showing the control system of the invention;

FIG. 2 is an enlarged longitudinal sectional view showing the interior of the movable control unit of the invention;

FIG. 3 is an enlarged vertical cross sectional view showing the servo valve of the invention;

FIG. 4 is a graph illustrating the characteristic behavior of a diaphragm of the type used in the servo valve of FIG. 3;

FIG. 5 is a diagrammatic view showing the diaphragm to which the graph of FIG. 3 relates;

FIG. 6 is a schematic view illustrating a modification to the control system of FIG. 1.

Referring to FIG. 1 of the drawings, reference character T designates an engine throttle which, as shown, is arranged for conventional control by an accelerator pedal 10, the throttle being connected to the pedal by way of arm 12, link 14, bell-crank 16 and link 18. Depression of the pedal 10 opens the throttle T against the force of a return spring 20 which tends to maintain the throttle in its illustrated idle position. The throttle is also operable by automatic governor mechanism G including a servo motor such as a flexible bellows 22 of the type shown in U.S. Patents 2,990,825 and 3,023,828 issued July 4, 1961, and Mar. 6, 1962, respectively, and in the aforementioned patent application. Throttle T connects with the bellows 22 through bead-chain 24 and is movable by the bellows out of its illustrated idle position into more open governing positions against the spring 20.

The governor mechanism G includes speed responsive means such as rotary fluid pressure generator unit 26 of the type shown, for example, in the aforesaid patents and patent application. Such generator unit 26, which may be conveniently connected into the speedometer cable 28 of a vehicle, as shown, for rotation according to vehicle speed, operates to increase pressure in outlet line 30 of the unit 26 as speed increases and to decrease pressure as speed decreases.

The governor mechanism G also includes a pneumatically operable servo valve 32 which is of the type disclosed in the aforesaid patent application, but which is capable of performing the added function of causing the speed of a vehicle to be increased according to the will of an operator to a desired value up to a predetermined maximum or of causing vehicle speed to be decreased according to the will of the operator from a speed greater than the predetermined maximum to a desired value not less than the predetermined maximum.

Servo valve 32, which is arranged to control the application of fluid pressure, in particular engine vacuum, to the bellows 22 includes a valve body 34 and valve plunger 36, the plunger 36 being supported on body 34 as by cantilever leaf springs 35 and 37 for substantially frictionfree or floating movement. The plunger 36 includes a plug 38 which is located in modulating relation to valve ports 40 and 42. The valve body 34 includes vacuum chamber 44 which connects through tube 46, valve 48 (when open) and passage 50 with the engine intake manifold I. Valve body 34 also includes chamber 52 which communicates through tube 54 with the working chamber of bellows 22; and is connectible with vacuum chamber 44 through port 40 and the chamber 56 through port 42. As shown, the chamber 56 is open to atmosphere through filter 58. To compensate for variations in engine vacuum acting axially on plug 38, the valve plunger 36 is provided with a piston 60 which nearly closes cylindrical opening 62 in a wall of vacuum chamber 44, but is always out of contact with said wall.

The servo valve includes a first pressure chamber 64 which connects with pressure generator 26 over line 30 and another pressure chamber 66 which is selectively connectible with the generator through valve 68 in the line 70 extending between the chamber and line 30. The chambers 64 and 66 have movable walls formed by diaphragms 72 and 74, respectively. Such diaphragms 72 and 74 are flexible except for rigid central portions formed by buttons, that is, the button 76 on diaphragm 72 and the button 78 on diaphragm 74. A spring 80 engages button 78 of diaphragm 74 and also the piston 60 located at one end of the valve plunger 36. The other end of the valve plunger is engaged by button 76 of diaphragm 72. During operation of the governor, fluid pressure produced by generator 26 acts in pressure chamber 64 and a force is exerted through button 76 of diaphragm 72 on valve plunger 36 in opposition to a biasing force established by trapping pressurized fluid in chamber 66. The valve plunger is operated according to forces thereon and meters air through the valve accordingly to control the operation of the bellows 22.

The operating range of diaphragm 72 is very small. Diaphragm 72 can move only slightly while the engine is running and operating generator 26 to pressurize chamber 64 because the diaphragm is then maintained in contact with valve plunger 36 and is restricted to the movements of which the plunger is capable, which movements are limited by engagement of plug 38 with ports 40 and 42 to distances that are, for example, of the order of a few thousandths of an inch. Spring 80, however, renders diaphragm 74 capable of being moved a substantial distance as compared to diaphragm 72, in response to pressure in chamber 66, as, for example, of the order of several hundredths of an inch.

It is a characteristic of flexible diaphragms such as 72 and 74 that, if restrained against expansion when subjected to fluid pressure, the diaphragm will exert a force depending not only on the magnitude of the fluid pressure, but also on the position of the diaphragm. This characteristic is illustrated by the graph of FIG. 4 plotted from data obtained by subjecting the diaphragm of FIG. 5 to a constant pressure and measuring the force F exerted by the button at various distances from the indicated reference position, a continuous decrease in the exerted force with increased displacement being clearly in evidence on the plot. Such characteristic is utilized to advantage in servo valve 32.

Diaphragm 74 is positioned in the valve with spring 80 so that with equal low speed pressures in chambers 64 and 66, the position of diaphragm 74, as compared to the position of diaphragm 72, is such that the upper diaphragm 74 exerts a greater force on plunger 36 than the lower diaphragm 72, and the plunger is urged downwardly by the resultant net force to open port 40 and close port 42 (see FIG. 3). As speed is increased and greater pressures are exerted in chambers 64 and 66, and diaphragm 74 is expanded to new positions against spring 80 while diaphragm 72 remains in substantially low speed position, being restrained (as previously noted) against substantial movement by the plunger. The displacement of diaphragm 74 reduces the net downward force on plunger 36 and at a predetermined speed, the forces exerted by the diaphragms on the plunger balance out. At still higher speeds and further increased pressures in the chambers 64 and 66, the net force on plunger 36 is reversed and the plunger is urged upwardly to open port 42 and close port 40. Screws 82 and 84 in the valve body are used to predetermine the speed at which forces balance on the plunger 36. As shown, screw 82 bears against casing 86 which clamps over the edge of diaphragm 74, and the casing 86 bears on spring washer 88. Screw 84 bears against casing 90 which clamps over the edge of diaphragm 72 and the casing rests on spring washer 92. The speed at which forces on the plunger balance is predetermined by subjecting the chambers 64 and 66 to a pressure corresponding to the selected speed and then turning either one or both of the screws 82 and 84 to relatively adjust the positions of the diaphragms as required to substantially eliminate any forces causing the plug 38 on the plunger 36 to assume a position of engagement with either of ports 40 or 42. Preferably, the speed predetermined in this manner is a speed suitable for highway driving such as 60 miles per hour, and in the description of the control system to follow it will be assumed that the speed at which forces on the plunger 36 balance has such a value, although it is to be understood that a different predetermined speed might be provided if desired as, for example, a maximum anticipated vehicle speed.

The governor mechanism G (FIG. 1) is activated and inactivated by the operation of valve 48. When the valve is open, there is communication between the engine manifold I and vacuum chamber 44 and the governor mechanism is in condition for operation. However, when the valve is closed, no such communication is possible and the governor cannot operate to automatically control speed. As shown, valve 48 is biased toward a closed position by spring 94. The valve is opened by the energization of solenoid coil 96.

The driver of a vehicle equipped with the control system of the invention prepares the system for automatic control by depressing button 98 in control unit 100 against spring 101 to close switch 102. When the switch 102 closes, it completes a cirucit for holding coils 103 and 105 which circuit extends from battery V over the ignition switch 106 (assuming the ignition switch has been turned on), the fuse 108, line 110, wire 111 in the control unit 100, coil 103, switch 102, coil 105 and line 124 to ground. The coils 103 and 105 hold switch 102 closed although the button is released, and thereafter an operator can condition the system to automatically regulate vehicle speed.

After the make ready button has been operated, the set speed button 134 is operated by momentarily depressing it against spring 135, to cause solenoid coil 96 to open valve 94 and to select a control speed for the governor G. The set speed button is operated when the vehicle is at a speed which the operator desires to maintain. Operation of button 134 causes switch arm 140 to engage contacts 139a and 139b to complete an energizing circuit for coil 104 from battery to ground over ignition switch 106, fuse 108, line 110, wire 111 in control unit 100, coil 103, switch 102, coil 105, coast switch 112, line 114, brake switch 118, line 120, the coil 104, line 122, switch arm 140 and line 124. The coil 104 closes conventionally arranged switch contacts 126 and 128, whereupon solenoid coil 96 is picked up by the completion of a holding circuit for coil 104 extending from battery V to ground over ignition switch 106, fuse 108, line 110, wire 111 in control unit 100, coil 103, switch 102, coil 105, coast switch 112, line 114, brake switch 118, line 120, line 130, the coil 96, line 132 and switch contact 126. The solenoid coil 96 opens the valve 48 and the valve remains open until the holding coil 104 is de-energized as in a manner described hereinafter.

Valve 68 operates to select a control speed for the governor when the set speed button is operated. As shown, the valve 68 is biased toward an open position by spring 136; however, the valve is normally maintained closed by solenoid coil 137 while the ignition switch 106 is turned on, the coil being then energized over a circuit extending from the battery V through the ignition switch 106, fuse 108, line 110, the set speed switch contacts 138a and 138b normally closed by switch arm 140, line 142 and the coil 137 to ground. When the set speed button 134 is momentarily depressed, the energizing circuit for coil 137 is opened and closed by switch arm 140 and valve 68 is therefore opened and closed to momentarily connect chamber 66 to pressure generator 26. In this manner, a pressure determined according to vehicle speed at the time of operation of the set speed button is established in chamber 66.

After operation of the set speed button, the servo valve 32 functions to automatically maintain throttle T in a position to control engine speed to a value substantially equal to the speed at which the vehicle was travelling when the button was momentarily depressed. Any slight decrease in speed such as might be experienced, for example, during uphill driving after the vehicle has been operating on a horizontal roadway results in a decrease in pressure in chamber 64, downward movement of the valve plunger 36, increased vacuum in bellows 22 and movement of throttle T toward a more open position. In the event of an increase in speed, pressure is increased in chamber 64 and valve plunger 36 is moved upwardly to cause the throttle to move toward a closed position.

The driver can change to a higher governor-controlled speed by depressing the accelerator pedal 10 until the vehicle attains the desired speed and then momentarily depressing the set speed button 134 to operate valve 68 as described and pressurize chamber 66 according to the increased speed. If he wishes to change to a lower governor-controlled speed, he momentarily depresses the coast button 144 against spring 145 to break the energizing circuit for solenoid coil 96. Valve 48 is closed by spring 94 inactivating the governor and the vehicle slows down. When the vehicle has decelerated to the desired speed, the set speed button 134 is momentarily depressed to reactivate the governor and to open and close valve 68.

Assuming the driver increases speed, as for passing, by depressing the accelerator pedal 10 to override governor G and does not operate the set speed button 134 while the vehicle is at the increased speed, the governor will function to cause the vehicle to assume the previously selected governor-controlled speed. If the vehicle has been slowed down by operation of the coast button 144 or the brake and the energizing circuit for holding coil 104 and solenoid coil 96 thereby opened at coast switch 112 or brake switch 118 to deactivate the governor, the driver can cause the vehicle to resume the pre-existing governor-controlled speed by momentarily depressing the resume speed button 146 against spring 147 to close switch 148. A circuit is thereby completed for holding coil 104 extending from battery V to ground over ignition switch 106, fuse 108, line 110, wire 111, coil 103, switch 102, coil 105, coast switch 112, line 114, brake switch 118, line 120, the coil 104, line 122, resume switch 148 and the wire 124. The holding coil 104 picks up to close contacts 126 and 128, and solenoid coil 96 is energized to reactivate the governor and re-establish the governor-controlled speed.

With the vehicle operating at a speed less than the predetermined speed determined by the adjustment of screws 82 and 84 in the servo valve, the driver can use the set speed button 134 in place of the accelerator pedal 10 to increase speed to any desired value up to the predetermined speed. To increase speed, the set speed button is depressed and held. This is in contrast to the momentary operation of the button required to select the operating speed as the control speed. While the button 134 is held down, valve 68 is held open by coil 137 and equal pressures are maintained in chambers 66 and 64 of the servo valve since both chambers then communicate with the pressure source 26. The plunger is, however, urged downwardly as viewed in the drawings to open valve port 40 and close valve port 42 by a net resultant force produced on the plunger, as explained hereinbefore, by the diaphragms 72 and 74. The bellows 22 is thereby connected through tube 54, port 42, tube 46, valve 48 and passage 50 with manifold vacuum, and therefore operates the throttle to increase speed. When a desired speed is attained, the set speed button 134 is released to close valve 68 and trap fluid in chamber 66 corresponding to the increased speed. Thereafter the servo valve 32 will operate to maintain the vehicle at substantially the speed at which the set speed button was released.

With the vehicle operating at a speed greater than the aforesaid predetermined speed, the driver can slow the vehicle down to any speed not less than the predetermined speed by holding down the set speed button. While the button is depressed, pressure is equalized in chambers 64 and 66, and the plunger is urged upwardly to open valve port 42 and close valve port 40 by a net resultant force exerted on the valve plunger 36 by the diaphragms. The bellows 22 is thereby connected with atmosphere through tube 54, chamber 52, port 42, chamber 56 and filter 58. The bellows expands relaxing tension on bead-chain 24 whereupon the spring 20 becomes effective to move the throttle T toward a closed position and effects a reduction in vehicle speed. When a desired reduced speed has been reached, the set speed button 134 is released. Valve 68 thereby closed and the governor G operates to maintain substantially the speed existing at the time of release.

It is an important feature of the control system of the invention that a driver can exercise a high degree of control over vehicle speed merely by the selective operation of control buttons in a control unit (unit 100) which can be conveniently positioned for operation by the driver or stored out of the way when not in use. A slack wire portion 150, formed in the control wires for the governor and located in the driver's compartment, enables the driver to position the control unit for operation or to store the unit as in a pocket 152 or other suitable holding means. Such slack wire portion of the driver's compartment may be formed, if desired, of wire coils or the control wires in the driver's compartment may (as shown) merely be of sufficient length to enable the unit to be moved about.

The control system may be modified as in the manner of FIG. 6 to provide an additional inlet passage 154 to the chamber 66 of the servo valve 32, and means for supplying fluid therethrough to the chamber as, for example, cylinder 156 connected to passage 154 by tube 158 and the piston 160 located in the cylinder 156. With the illustrated arrangement, a driver can exercise an increased measure of control over speed (while the governor is activated). He can increase or decrease speed as gradually as desired to keep pace in traffic. Speed is increased by turning knob 162 in a direction to increase pressure in chamber 66 such that valve plunger 36 is moved downwardly in the servo valve, and speed is decreased by turning the knob in the opposite direction to decrease pressure in chamber 66 such that the valve plunger is moved upwardly in the servo valve.

Various other modifications and changes which might be made in the control system without departing from the spirit and scope of the invention will be apparent to those skilled in the art. We aim to cover all such modifications and changes in the annexed claims.

We claim:

1. An automatic control system for an automotive vehicle having a driver's compartment, said system comprising a throttle; a speed responsive governor connected with the throttle to enable control thereof by the governor; electrically controllable means for initiating governor control and setting the governor to regulate vehicle speed to a selected value; a manually operable control unit located in the driver's compartment; and electric circuit means operably connecting the electrically controllable means with said unit for controlling said means according to the operation of the control unit, said circuit means including a slack wire portion in the driver's compartment permitting the control unit to be conveniently located by a driver for operation or stored out of the way when not in use.

2. An automotive control system as defined in claim 1 wherein the slack wire portion is formed at least in part by wire coils.

3. An automatic control system as defined in claim 1 including holding means in the driver's compartment in a location to receive and store the control unit when not in use.

4. An automatic control system as defined in claim 1 having a pocket formed in the driver's compartment in a location to receive and store the control unit when not in use.

5. An automatic control system for an automotive vehicle having a driver's compartment, said system comprising a throttle; a speed responsive governor connected with the throttle to enable control thereof by the governor; first electrically controllable means for initiating and discontinuing governor control; additional electrically controllable means for setting the governor to control speed to a selected value; a control unit including a plurality of manually operable element; and electric circuit means operably connecting the control unit to the said first and additional control means enabling a driver by the selective operation of the elements of the control unit to initiate governor control and set the governor to control at a selected speed, to discontinue governor control, and to resume governor control at a preselected speed after discontinuance thereof, said electric circuit means including a slack wire portion in the driver's compartment permitting the control unit to be conveniently located by a driver for operation or stored out of the way when not in use.

6. An automatic control system as defined in claim 5 wherein the manually operable elements are all push buttons.

7. An automatic control system for an automotive vehicle having a driver's compartment, said system comprising a throttle; a speed responsive governor connected with the throttle to enable control thereof by the governor; first electrically controllable means for initiating and discontinuing governor control; and additional electrically controllable means operable to set the governor to control speed to a selected value or to render the governor effective to change vehicle speed; a control unit including a plurality of manually operable elements; and electric circuit means operably connecting the control unit to the said first and additional control means enabling a driver by the selective operation of the elements of the control unit to initiate governor control and set the governor to control at a selected speed, to discontinue governor control, to resume governor control at a preselected speed after discontinuance thereof, and to change vehicle speed, said electric circuit means including a slack wire portion permitting the control unit to be conveniently located by a driver for operation or stored out of the way when not in use.

8. In a speed control system for automotive vehicles, the combination comprising a servo motor; a servo valve connected with the servo motor, said servo valve having a plunger therein for metering fluid to the servo motor; a throttle connected with the servo motor and operable thereby according to the operation of the valve plunger; means in said servo valve limiting the maximum possible movement of the plunger; means for generating fluid pressure according to vehicle speed; a first pressure chamber connected to the pressure generating means and including a pressure responsive diaphragm connected to the valve plunger for moving the plunger in response to speed variations; another pressure chamber including a pressure responsive diaphragm; means for connecting said another pressure chamber to the pressure generating means; and means connecting the pressure diaphragm of said another pressure chamber to the plunger and including resilient means enabling the pressure diaphragm of the said another presssure chamber to move a greater distance than the diaphragm of said first pressure chamber in response to the application of equal pressures in the chambers; and means for relatively positioning the diaphragms to cause said diaphragms to exert a net force on the plunger tending to move the plunger in a direction to increase speed upon the application to said chambers of equal pressures generated at less than a predetermined speed by the pressure generating means.

9. In a speed control system for automotive vehicles, the combination comprising a servo motor; a servo valve connected with the servo motor, said servo valve including a valve housing with a plunger operable therein for metering fluid to the servo motor; a throttle connected with the servo motor and operable thereby according to the operation of the valve plunger; means in said servo valve limiting the maximum possible movement of the plunger; means for generating fluid pressure according to vehicle speed; a first pressure chamber mounted in the valve housing and connected to the pressure generating means, said first pressure chamber including a pressure responsive diaphragm connected to the valve plunger for moving the plunger in response to speed variations; another pressure chamber mounted in the valve housing and including a pressure responsive diaphragm; means for connecting said another pressure chamber to the pressure generating means; means connecting the pressure diaphragm of said another pressure chamber to the plunger and including resilient means enabling the pressure diaphragm of said another pressure chamber to move a greater distance than the diaphragm of said first pressure chamber in response to the application of equal pressures to the chambers; means operable on at least one of the chambers for adjusting the position of such chamber in the valve and thereby the positon of the diaphragm of the chamber; the said diaphragms being relatively positioned with the adjusting means to exert a net force on the plunger tending to move the plunger in a direction to increase speed upon the application to said chambers of equal pressures generated at less than a predetermined speed by the pressure generating means.

10. The combination of claim 1 wherein the adjusting means includes a first element operable on the first valve chamber for adjusting the pressure responsive diaphragm thereof in the valve, and another element operable on the other valve chamber for adjusting the pressure responsive diaphragm of such other chamber in the valve.

11. In a speed control system for automotive vehicles, the combination comprising a servo motor; a servo valve connected with the servo motor, said servo valve having a plunger therein for metering fluid to the servo motor; a throttle connected with the servo motor and operable thereby according to the operation of the valve plunger; means for generating fluid pressure according to vehicle speed; a first pressure chamber connected to the pressure generating means and including a pressure responsive diaphragm connected to the valve plunger for moving the plunger in response to speed variations; another pressure chamber including a pressure responsive diaphragm operatively connected with the valve plunger; means for connecting said another pressure chamber to the pressure generating means including valve means; control means for the valve means operable to cause the valve means to entrap pressure in said another chamber corresponding to vehicle speed at the time of operation such that the servo valve is operated to maintain the vehicle at such speed; and manually controllable means operable to increase pressure in said another chamber relative to pressure in the first chamber to thereby cause the plunger to be operated so as to increase vehicle speed, and operable to decrease pressure in the said another chamber relative to pressure in the first chamber to thereby cause the plunger to be operated so as to decrease vehicle speed.

12. In a speed control system for automotive vehicles, the combination comprising a servo motor; a servo valve connected with the servo motor, said servo valve having a plunger therein for metering fluid to the servo motor; a throttle connected with the servo motor and operable thereby according to the operation of the valve plunger; means in said servo valve limiting the maximum possible movement of the plunger; means for generating fluid pressure according to vehicle speed; a first pressure chamber connected to the pressure generating means and including a pressure responsive diaphragm connected to the valve plunger for moving the plunger in response to speed variations; another pressure chamber including a pressure responsive diaphragm; means for connecting said another pressure chamber to the pressure generating means; and means connecting the pressure diaphragm of said another pressure chamber to the plunger and including resilient means enabling the pressure diaphragm of the said another pressure chamber to move a greater distance than the diaphragm of said first pressure chamber in response to the application of equal pressures to the chambers; and means for relatively adjusting the positions of the diaphragms to select a predetermined speed at which the diaphragm exert equal and opposite forces on the plunger in response to the application of equal pressures generated at such speed, below which predetermined speed the diaphragms exert a net force on the plungers tending to move the plunger in a direction to increase speed in response to equal pressures generated at less than the predetermined speed, and above which predetermined speed the diaphragms exert a net force on the plunger tending to move the plunger in a direction to decrease speed in response to pressures generated at speeds greater than the predetermined speed.

13. In a speed control system for automotive vehicles, the combination comprising a servo motor; a servo valve connected with the servo motor, said servo valve having a plunger therein for metering fluid to the servo motor; a throttle connected with the servo motor and operable thereby according to the operation of the valve plunger; means in said servo valve limiting the maximum possible movement of the plunger; means for generating fluid pressure according to vehicle speed; a first pressure chamber connected to the pressure generating means and including a pressure responsive diaphragm connected to the valve plunger for moving the plunger in response to speed variations; another pressure chamber including a pressure responsive diaphragm; means for connecting said another pressure chamber to the pressure generating means; means connecting the pressure diaphragm of said another pressure chamber to the plunger and including resilient means enabling the pressure diaphragm of the said another pressure chamber to move a greater distance than the diaphragm of said first pressure chamber in response to the application of equal pressures to the chambers, the said diaphragms being relatively positioned to exert equal and opposite forces on the plunger in response to the application of equal pressures generated at a predetermined speed selected as a preferable speed for highway driving, to exert a net force on the plunger tending to move the plunger in a direction to increase speed in response to equal pressures generated at less than the predetermined speed, and to exert a net force on the plunger tending to move the plunger in a direction to decrease speed in response to pressures generated at speeds greater than the predetermined speed; and manually controllable means operable to increase pressure in said another chamber relative to the first chamber to cause the valve plunger to be moved in a direction to increase vehicle speed, and operable to decrease pressure in said another chamber relative to the first chamber to cause the valve plunger to be moved in a direction to decrease vehicle speed.

References Cited
UNITED STATES PATENTS

| | | | |
|---|---|---|---|
| 1,587,083 | 6/1926 | Neuzerling | 180—2 |
| 1,652,293 | 12/1927 | Auge | 200—5 |
| 2,973,051 | 2/1961 | Teetor | 180—82.1 |
| 3,023,828 | 3/1962 | Fuller et al. | 180—82.1 |
| 3,062,310 | 11/1962 | McCathron et al. | 180—82.1 |
| 3,116,807 | 1/1964 | Wilson | 180—82.1 |
| 3,249,176 | 5/1966 | Dangler et al. | 180—82.1 |

KENNETH H. BETTS, *Primary Examiner.*